United States Patent
Boissard

(10) Patent No.: US 11,332,237 B2
(45) Date of Patent: May 17, 2022

(54) METHOD FOR CONTROLLING THE TORQUE OF AN AIRCRAFT WHEEL ROTATION DRIVE DEVICE

(71) Applicant: SAFRAN LANDING SYSTEMS, Velizy Villacoublay (FR)

(72) Inventor: Laurent Boissard, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 40 days.

(21) Appl. No.: 16/709,135

(22) Filed: Dec. 10, 2019

(65) Prior Publication Data

US 2020/0180753 A1 Jun. 11, 2020

(30) Foreign Application Priority Data

Dec. 11, 2018 (FR) ...................................... 18 72689

(51) Int. Cl.
*B64C 25/34* (2006.01)
*B64C 25/40* (2006.01)
*B64C 25/42* (2006.01)
*B64C 25/50* (2006.01)

(52) U.S. Cl.
CPC ............ *B64C 25/405* (2013.01); *B64C 25/34* (2013.01); *B64C 25/42* (2013.01); *B60L 2200/10* (2013.01); *B64C 25/50* (2013.01); *B64D 2205/00* (2013.01)

(58) Field of Classification Search
CPC .......................... B64C 25/405; B64D 2205/00
See application file for complete search history.

(56) References Cited

U.S. PATENT DOCUMENTS

| | | | |
|---|---|---|---|
| 2012/0168557 A1* | 7/2012 | Edelson | B64C 25/405 244/50 |
| 2015/0175257 A1* | 6/2015 | Goree | H02P 29/10 701/3 |
| 2015/0210383 A1* | 7/2015 | De Mers | B64D 31/04 244/50 |

(Continued)

FOREIGN PATENT DOCUMENTS

| | | |
|---|---|---|
| EP | 2 886 454 A1 | 6/2015 |
| EP | 3 118 106 A1 | 1/2017 |

(Continued)

OTHER PUBLICATIONS

French Search Report of French Application No. 1872689 dated Aug. 1, 2019.

*Primary Examiner* — Philip J Bonzell
*Assistant Examiner* — Tye William Abell
(74) *Attorney, Agent, or Firm* — Sughrue Mion, PLLC

(57) ABSTRACT

The invention relates to a method for controlling the torque of a drive device (1) for rotating wheels (2) of an aircraft comprising actuators for selectively driving rotating wheels of the aircraft to ensure its movement on the ground, comprising the step of regulating a torque generated by the drive device according to a torque setpoint (4) issued by the pilot. According to the invention, the method involves the step of generating, as long as the torque setpoint is not sufficient to guarantee a stable movement speed of the aircraft, a replacement torque setpoint (5) to allow the aircraft to move at a stable speed, and substituting the replacement torque setpoint for the torque setpoint generated by the pilot.

6 Claims, 1 Drawing Sheet

(56) References Cited

U.S. PATENT DOCUMENTS

2017/0015410 A1* 1/2017 Colosimo ............... B64C 19/00
2018/0134377 A1* 5/2018 Gorce .................. G05D 1/0223
2021/0047026 A1* 2/2021 Spierling ............... B64D 31/06

FOREIGN PATENT DOCUMENTS

EP          3 321 758 A1    5/2018
WO       2012/061532 A1    5/2012

* cited by examiner

[Fig. 1]
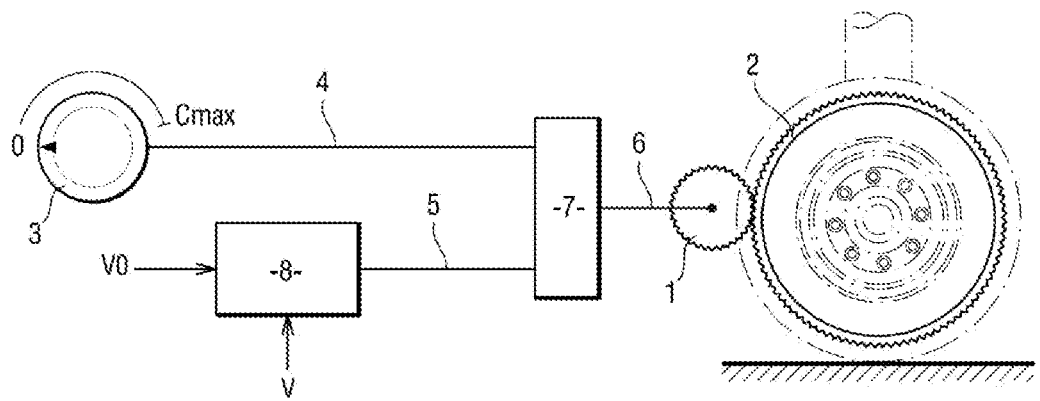
[Fig. 2]
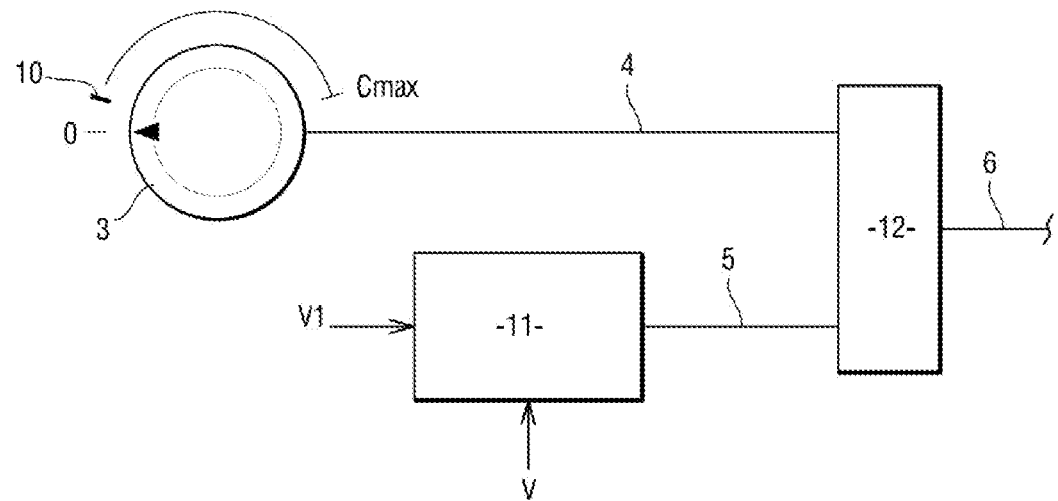
[Fig. 3]
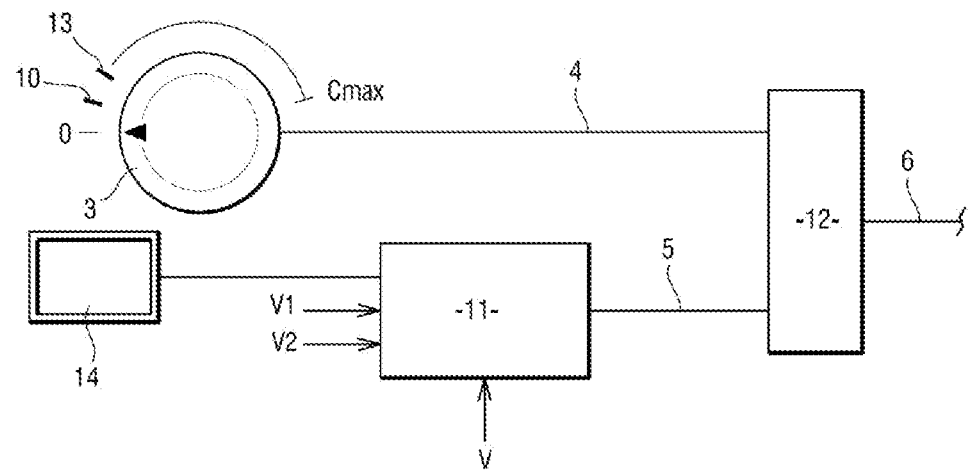

METHOD FOR CONTROLLING THE TORQUE OF AN AIRCRAFT WHEEL ROTATION DRIVE DEVICE

The invention relates to a method for controlling speed of a device for driving the wheels of an aircraft in rotation.

BACKGROUND OF THE INVENTION

Aircraft wheel rotation drive devices that can move the aircraft on the ground without the assistance of its power trains are known. The drive device includes drive actuators adapted to drive aircraft wheels in rotation when placed in the wheel engagement position. On an aircraft with two main landing gears, such as the AIRBUS A320, for instance, drive devices have been proposed with at least one drive actuator on each of the main landing gears adapted to drive at least one wheel in rotation. Various control strategies for these drive devices have been proposed, including strategies to control an aircraft speed at a pilot-generated torque setpoint.

Torque control has the advantage of resembling for the pilot a conventional aircraft movement using the throttle. However, maintaining a low and stable speed without oscillation, for example, when approaching an airport terminal door, is difficult to achieve, even for an experienced pilot.

PURPOSE OF THE INVENTION

The purpose of the invention is to facilitate the movement of the aircraft on the ground by facilitating its low speed operation.

SUMMARY OF THE INVENTION

To achieve this goal, it is proposed a method for controlling torque of a drive device for rotating wheels an aircraft comprising actuators for selectively driving rotating wheels of the aircraft to ensure its movement on the ground, comprising the step of regulating a torque generated by the drive device according to a torque setpoint issued by the pilot. According to the invention, the method involves the step of generating, as long as the torque setpoint is not sufficient to guarantee a stable movement speed of the aircraft, a replacement torque setpoint to allow the aircraft to move at a stable speed and substituting the replacement torque setpoint for the pilot-generated torque setpoint.

Thus, as long as the torque setpoint generated by the pilot is not sufficient to ensure the movement of the aircraft at a stable speed, the method allows the generation of a replacement torque setpoint to ensure the movement of the aircraft at a stable speed, which considerably facilitates the operation of the aircraft at low speed. It is only when the pilot significantly increases the torque setpoint, for example, when leaving the terminal door to the threshold of the runway, that the servocontrol uses the torque setpoint generated by the pilot again.

The transition between the two speeds can take place in many ways. As a first specific implementation mode, the substitution of the replacement torque setpoint for the torque setpoint generated by the pilot is done in a transparent manner for the pilot. Thus, the pilot thinks he/she is generating a low torque setpoint, but in fact the servocontrol system generates a replacement torque setpoint increased as necessary to ensure a stable movement speed, which is not likely to surprise the pilot. The operational torque setpoint that will be provided to the wheel drive system is then the maximum of the torque setpoint generated by the pilot and the replacement torque setpoint.

A second particular mode of implementation is to use a control element with at least one notch for which a stable movement speed is regulated. It is only after this notch has been gone beyond that the actuator allows the pilot to generate a torque setpoint.

Preferably then, the generating element has a button to control speed regulation for the aircraft speed at the time the button is actuated, after going beyond the notch(es) of the torque setpoint generating element.

BRIEF DESCRIPTION OF THE DRAWINGS

The invention will be better understood upon reading the following description of specific embodiments of the method of the invention, while referring to the appended figures, wherein:

FIG. 1 is a block diagram of a servocontrol implementing the method of the invention according to a first particular mode of implementation;

FIG. 2 is a block diagram of a servocontrol implementing the method of the invention according to a second particular mode of implementation;

FIG. 3 is a figure similar to that in FIG. 2 illustrating an alternative implementation.

DETAILED DESCRIPTION OF THE INVENTION

The method of the invention, detailed here with reference to FIG. 1, is intended to facilitate the movement of an aircraft by means of a device 1 for driving the wheels 2 of the aircraft. The drive device 1 is not the subject of the invention. It generally includes drive actuators equipped with geared motors for rotating wheels on the main landing gears. The invention relates to the way in which the drive device 1 is controlled.

Pilots are used to moving an aircraft on the ground using the throttle. The purpose of controlling the drive device by generating a torque setpoint is to provide pilots with a familiar taxiing mode of by dosing the propulsion force via the torque delivered to the wheels by the wheel drive device. For this purpose, the pilot has here a lever 3 with a stroke allowing the pilot to control a nominal torque setpoint 4 between 0% and 100% of a maximum torque Cmax.

However, experiments have shown that maintaining a stable speed at low speed is difficult, even for experienced pilots. To overcome this disadvantage, the method of the invention involves the generation of a replacement torque setpoint 5 which will temporarily replace the nominal torque setpoint 4.

The replacement torque setpoint 5 is generated by a generator 8 at a value that allows the aircraft to move at a stable speed. In practice, a torque value is used to move the aircraft at a low but stabilized speed Vo, facilitating the management of an aircraft approaching an airport terminal door.

An operational torque setpoint 6 is then transmitted to the drive device which, as appropriate, will be equal to the nominal torque setpoint 4 or the replacement torque setpoint 5. In the implementation mode illustrated here, the nominal torque setpoint 4 and the replacement torque setpoint are continuously compared here by a comparator 7 which generates an operational setpoint 6 equal to the maximum of these two values. Thus, the selection of either value is transparent to the pilot. Here, the generator 8 does not perform a speed control, but only generates a replacement setpoint 5 of a sufficient value to ensure stable speed movement.

According to a second implementation mode illustrated in FIG. 2, the lever 3 has a notch 10 at the beginning of the stroke which the pilot can position the lever 3 on to activate a torque setpoint generator 11 that generates a replacement torque setpoint 5 determined so as to control the speed V of the aircraft at a first determined setpoint speed V1. The replacement torque setpoint 5 is thus determined in real time, for example as a function of a difference between the speed of the aircraft V and the speed setpoint V1, to control the speed V of the aircraft to the setpoint speed V1. This ensures a substantially constant speed that facilitates the operation of the aircraft in the vicinity of the terminal building. A selector 12 generates an operational setpoint 6 equal to the replacement torque setpoint 5 if the generator 11 is activated, or equal to the nominal torque setpoint 4 if the generator 11 is not activated.

Of course, as shown in FIG. 3, a second notch 13 can be provided on the lever 3 for which the torque setpoint generator 11 generates a replacement torque setpoint determined so as to control the speed V of the aircraft to a second determined setpoint speed V2. Thus, the pilot has two notches at his/her disposal to operate the aircraft at two predetermined speeds, namely V1 (for example, an approach speed to a terminal door) and V2 (for example, a movement speed in an area near the terminal). The pilot can still manoeuvre the lever 3 to go beyond these two notches and send a much higher torque setpoint to the drive device to cause the aircraft to move at a higher speed, for example, when taxiing between the terminal building and the runway. Of course, other notches can also be provided, corresponding to the same number of predetermined speeds.

According to a specific implementation mode, a speed regulation control 14 is provided on the lever 3 to control the speed V of the aircraft to the speed Va of the aircraft when the pilot actuates the control 14. A replacement torque setpoint 5 is then generated by the generator 11, even without any action by the pilot on the lever 3, to ensure this speed control.

The invention is not limited to what has just been described, but encompasses every alternative solution within the scope of the claims.

The invention claimed is:

1. A method for controlling a torque of a drive device for rotating wheels of an aircraft comprising actuators for selectively driving the rotating wheels of the aircraft to ensure a movement of the aircraft on the ground, the method comprising:

regulating the torque generated by the drive device according to a torque setpoint issued by a pilot of the aircraft; and generating, as long as the torque setpoint is not sufficient to guarantee a movement speed of the aircraft without oscillation, a replacement torque setpoint to allow the aircraft to move at the movement speed without oscillation; and substituting the replacement torque setpoint for the torque setpoint generated by the pilot.

2. The method according to claim 1, wherein the replacement torque setpoint is substituted for the torque setpoint as long as the replacement torque setpoint is greater than the torque setpoint.

3. The method according to claim 1, wherein the replacement torque setpoint is generated by a torque setpoint generator so as to control an aircraft movement speed below a speed setpoint.

4. The method according to claim 3, wherein the speed setpoint is a speed of the aircraft at a time of actuation by the pilot of a speed regulation control.

5. The method according to claim 3, wherein the torque setpoint generator is activated by the pilot by placing a torque control lever on a predetermined notch arranged at a beginning of a stroke.

6. The method according to claim 5, wherein the torque control lever has a plurality of notches, for controlling an aircraft speed according to a plurality of respective predetermined setpoints.

* * * * *